US007678878B2

United States Patent
Andrews et al.

(10) Patent No.: US 7,678,878 B2
(45) Date of Patent: Mar. 16, 2010

(54) PROCESS FOR PRODUCING POLYESTER WITH METAL PHOSPHONIC ACID COMPLEX CATALYSTS

(75) Inventors: Stephen M. Andrews, New Fairfield, CT (US); Jianzhao Wang, Yorktown Heights, NY (US); Thomas Thompson, Highland Mills, NY (US); Paragkumar N. Thanki, Maharashtra (IN); Deepak M. Rane, Mumbai (IN); Suhas D. Sahasrabudhe, Maharashtra (IN); Preetam P. Ghogale, Mumbai (IN); Paul A. Odorisio, Leonia, NJ (US); Si Wu, Ossining, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 12/321,946

(22) Filed: Jan. 27, 2009

(65) Prior Publication Data

US 2009/0143561 A1    Jun. 4, 2009

Related U.S. Application Data

(63) Continuation of application No. 11/901,478, filed on Sep. 17, 2007, now abandoned.

(60) Provisional application No. 60/845,723, filed on Sep. 19, 2006.

(51) Int. Cl.
*C08G 63/00* (2006.01)

(52) U.S. Cl. .................. 528/286; 528/271; 528/272; 528/274; 502/150; 502/155; 502/162; 502/164

(58) Field of Classification Search ............. 528/271, 528/272, 275, 301, 355, 356, 357, 358, 286; 502/150, 155, 162, 164
See application file for complete search history.

(56) References Cited

U.S. PATENT DOCUMENTS

| 3,310,575 | A  | 3/1967 | Spivack ................. 260/429 |
| 3,824,192 | A  | 7/1974 | DiBattista et al. ......... 252/400 |
| 6,075,115 | A  | 6/2000 | Putzig et al. ............. 528/279 |
| 6,383,970 | B1 | 5/2002 | Mimura et al. ........... 502/162 |
| 6,787,630 | B1 | 9/2004 | Dominguez De Walter et al. ................. 528/279 |
| 2003/0083191 | A1 | 5/2003 | Nakajima et al. ......... 502/100 |
| 2004/0058805 | A1 | 3/2004 | Nakajima et al. ......... 502/152 |
| 2004/0254330 | A1 | 12/2004 | Duan et al. ............ 528/275 |

FOREIGN PATENT DOCUMENTS

EP    1065230    *  1/2001

OTHER PUBLICATIONS

Disclosed Anonymously, Improved polyester production, plyester quality improvement and enhancing melt strength of polyesters by the use of phosphonates in combination with polyfunctional compounds, Mar. 19, 2004, IP.com Journal (2004), 4(4), 36 (No. IPCOM000022516D).*
English Abstract of TW 526235, Apr. 1, 2003.
English Abstract of EP 1065230, Jan. 3, 2001.

\* cited by examiner

*Primary Examiner*—Ling-Siu Choi
*Assistant Examiner*—Frances Tischler
(74) *Attorney, Agent, or Firm*—Tyler A. Stevenson

(57) ABSTRACT

Disclosed is a method for the preparation of a polyester, which method comprises in a first step, reacting a dicarboxylic acid or a $C_1$-$C_4$ dicarboxylic diester with a diol at a suitable temperature and pressure to effect esterification or transesterification to prepare a precondensate and in a second step, reacting the precondensate to effect polycondensation at a suitable temperature and pressure to prepare a high molecular weight polyester, where a metal phosphonic acid complex compound of the formula

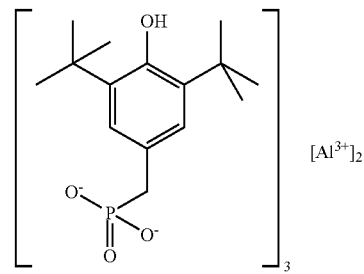

is employed in the first step, in the second step or in both the first and second steps as a reaction catalyst.

20 Claims, No Drawings

PROCESS FOR PRODUCING POLYESTER WITH METAL PHOSPHONIC ACID COMPLEX CATALYSTS

This application is a continuation of application Ser. No. 11/901,478, filed Sep. 17, 2007, abandoned, which claims benefit of U.S. provisional app. No. 60/845,723, filed Sep. 19, 2006, the disclosures of which are hereby incorporated by reference.

The invention relates to a method for the preparation of polyesters, in particular polyethylene terephthalate, which method comprises employing certain metal phosphonic acid complex catalysts.

BACKGROUND

Polyesters, such as polyethylene terephthalate (PET) are prepared industrially in a two stage process. The first stage in PET preparation involves the direct esterification of terephthalic acid with ethylene glycol, or alternatively transesterification of a $C_1$-$C_4$ dialkylterephthalate with ethylene glycol to form a low molecular weight precondensate. In a second stage, the precondensate is polycondensed to form high molecular weight polyethylene terephthalate. Both stages typically employ catalytic acceleration.

Depending on the end use of the polyester, a further solid state polymerization (SSP) is employed to arrive at the desired viscosity.

Numerous compounds have been proposed as esterification, transesterification or polycondensation catalysts. Choice of catalyst effects the color, strength and processing properties of the end product. Choice of catalyst effects for example the amount of aldehyde generation. Catalyst selection also controls selectivity of the reaction and provides for final products reduced in unwanted impurities such as diethylene glycol, cyclic oligomers and carboxylic acid end groups.

U.S. published app. No. 2003083191 is aimed at polyester polymerization catalysts that are combination of aluminum or an aluminum compound and a phosphorus metal salt compound. The aluminum compounds are for example carboxylates, inorganic acid salts, aluminum alkoxides, aluminum chelate compounds or organoaluminum compounds.

U.S. published app. No. 2004058805 is aimed at polyester polymerization catalysts that comprise at least one member selected from aluminum and aluminum compounds as a first metal-containing component in the presence of at least one phosphorus compound selected from formula 1 and 2.

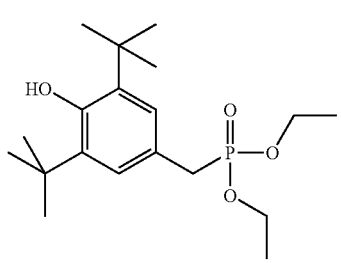

formula 1

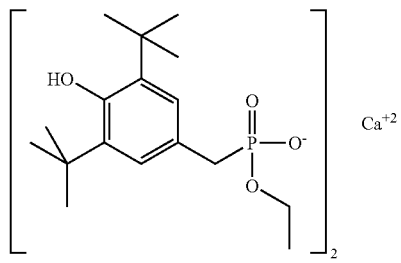

formula 2

U.S. Pat. Nos. 3,310,575 and 3,824,192 disclose metal (O-alkyl)-3,5-di-t-butyl-4-hydroxybenzylphosphonates. The metal phosphonates are taught as polymer stabilizers.

U.S. Pat. No. 6,383,970 teaches solid acid catalysts.

TW 526235 discloses a production process for polyester resin.

Suitable catalysts for the preparation of polyesters, in particular polyethylene terephthalate are still being sought. Said catalysts are employed in the first or second stages of preparation, or in both stages.

SUMMARY

Disclosed is a method for the preparation of a polyester, which method comprises in a first step, reacting a dicarboxylic acid or a $C_1$-$C_4$ dicarboxylic diester with a diol at a suitable temperature and pressure to effect esterification or transesterification to prepare a precondensate and in a second step, reacting the precondensate to effect polycondensation at a suitable temperature and pressure to prepare a high molecular weight polyester, where a metal phosphonic acid complex compound of the formula

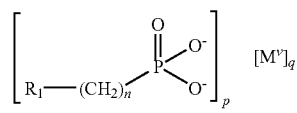

is employed in the first step, in the second step or in both the first and second steps as a reaction catalyst; and wherein
n is 0, 1, 2, 3, 4, 5 or 6;
p is an integer from 1 to 30;
M is a metal selected from the group consisting of Li, Na, K, Cs, Be, Ca, Mg, Sr, Ba, Al, Sb, Cd, Mn, Fe, Co, Ni, Cu and Zn;
v is the valency of the metal M and is 1, 2 or 3;
q is an integer from 1 to 20 where q=2p/v; and
$R_1$ is hydrogen, straight or branched chain alkyl of 1 to 36 carbon atoms, straight or branched chain alkenyl of 1 to 36 carbon atoms, cycloalkyl of 5 to 8 carbon atoms or aryl of 6 to 10 carbon atoms; or is said alkyl, alkenyl, cycloalkyl or aryl substituted by one to four hydroxyl, halogen, straight or branched chain alkoxy of 1 to 8 carbon atoms, straight or branched chain alkyl of 1 to 8 carbon atoms or amino groups.

DETAILED DESCRIPTION

The metal phosphonic acid complex compound is for example of the formula

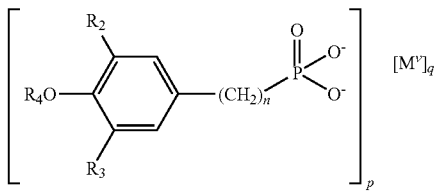

wherein n is 0, 1, 2, 3, 4, 5 or 6;

p is an integer from 1 to 30 where $p=(v \cdot q)/2$;

M is a metal selected from the group consisting of Li, Na, K, Cs, Be, Ca, Mg, Sr, Ba, Al, Sb, Cd, Mn, Fe, Co, Ni, Cu and Zn;

v is the valency of the metal M and is 1, 2 or 3;

q is an integer from 1 to 20 where $q=2p/v$; and $R_2$ and $R_3$ are independently hydrogen, hydroxyl, halogen, straight or branched chain alkoxy of 1 to 8 carbon atoms, straight or branched chain alkyl of 1 to 8 carbon atoms or amino; and $R_4$ is hydrogen or straight or branched chain alkyl of 1 to 8 carbons atoms.

The metal phosphonic acid complex compound is for example of the formula

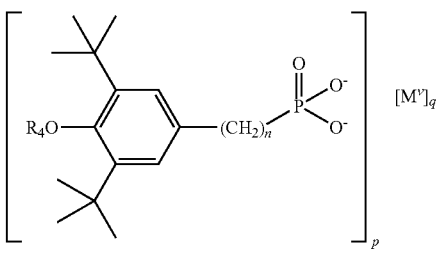

wherein n is 0, 1, 2, 3, 4, 5 or 6;

p is an integer from 1 to 30 where $p=(v \cdot q)/2$;

M is a metal selected from the group consisting of Li, Na, K, Cs, Be, Ca, Mg, Sr, Ba, Al, Sb, Cd, Mn, Fe, Co, Ni, Cu and Zn;

v is the valency of the metal M and is 1, 2 or 3;

q is an integer from 1 to 20 where $q=2p/v$; and $R_4$ is hydrogen or straight or branched chain alkyl of 1 to 8 carbons atoms.

The metal phosphonic acid complex compound is for example of the formula

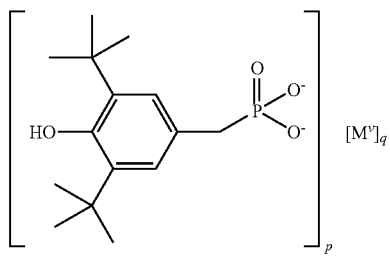

where p is an integer from 1 to 30 where $p=(v \cdot q)/2$;

M is a metal selected from the group consisting of Li, Na, K, Cs, Be, Ca, Mg, Sr, Ba, Al, Sb, Cd, Mn, Fe, Co, Ni, Cu and Zn;

v is the valency of the metal M and is 1, 2 or 3; and q is an integer from 1 to 20 where $q=2p/v$.

The metal phosphonic acid complex compound is for example of the formula

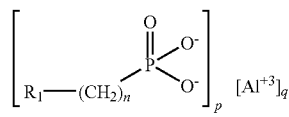

wherein n is 0, 1, 2, 3, 4, 5 or 6;

p is an integer from 3 to 30;

q is an integer from 2 to 20 where $q=2p/3$; and $R_1$ is hydrogen, straight or branched chain alkyl of 1 to 36 carbon atoms, straight or branched chain alkenyl of 1 to 36 carbon atoms, cycloalkyl of 5 to 8 carbon atoms or aryl of 6 to 10 carbon atoms; or is said alkyl, alkenyl, cycloalkyl or aryl substituted by one to four hydroxyl, halogen, straight or branched chain alkoxy of 1 to 8 carbon atoms, straight or branched chain alkyl of 1 to 8 carbon atoms or amino groups.

The metal phosphonic acid complex compound is for example of the formula

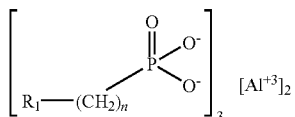

wherein n is 0, 1, 2, 3, 4, 5 or 6;

$R_1$ is hydrogen, straight or branched chain alkyl of 1 to 36 carbon atoms, straight or branched chain alkenyl of 1 to 36 carbon atoms, cycloalkyl of 5 to 8 carbon atoms or aryl of 6 to 10 carbon atoms; or is said alkyl, alkenyl, cycloalkyl or aryl substituted by one to four hydroxyl, halogen, straight or branched chain alkoxy of 1 to 8 carbon atoms, straight or branched chain alkyl of 1 to 8 carbon atoms or amino groups.

The metal phosphonic acid complex compound is for example of the formula

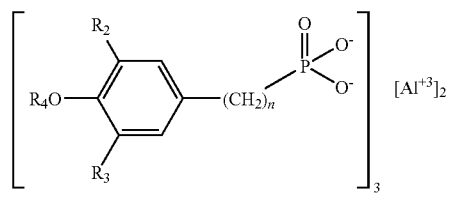

wherein n is 0, 1, 2, 3, 4, 5 or 6;

$R_2$ and $R_3$ are independently hydrogen, hydroxyl, halogen, straight or branched chain alkoxy of 1 to 8 carbon atoms, straight or branched chain alkyl of 1 to 8 carbon atoms or amino; and $R_4$ is hydrogen or straight or branched chain alkyl of 1 to 8 carbons atoms.

The metal phosphonic acid complex compound is for example of the formula

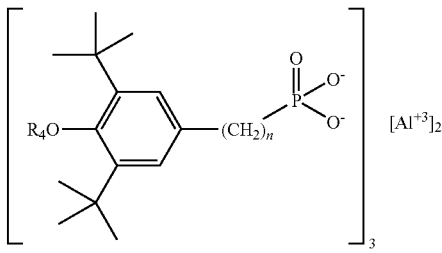

wherein n is 0, 1, 2, 3, 4, 5 or 6; and $R_4$ is hydrogen or straight or branched chain alkyl of 1 to 8 carbons atoms.

The aluminum phosphonic acid complex compound is in particular the compound

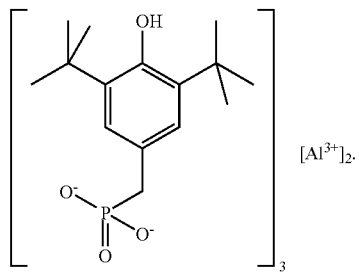

The aluminum catalyst is prepared for example as disclosed in U.S. Pat. No. 3,310,575, the disclosure of which is incorporated by reference.

Alkyl having up to 36 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5, 5-hexamethylhexyl, tridecyl, tetradecyl, pentadecyl, hexadecyl, heptadecyl, octadecyl, icosyl or docosyl.

Alkenyl is an unsaturated version of alkyl, for example allyl, isopropenyl, propenyl, hexenyl, heptenyl, and the like.

Unsubstituted or alkyl-substituted cycloalkyl is, for example, cyclopentyl, methyl-cyclopentyl, dimethylcyclopentyl, cyclohexyl, methylcyclohexyl, dimethylcyclohexyl, trimethyl-cyclohexyl, tert-butylcyclohexyl, cycloheptyl or cyclooctyl. For example cyclohexyl and tert-butylcyclohexyl.

Aryl is phenyl or naphthyl. Alkyl-substituted aryl, which contains for example 1 to 3, for instance 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

The dicarboxylic acid is selected from the group consisting of aromatic dicarboxylic acids having 8 to 14 carbon atoms, aliphatic dicarboxylic acids having 4 to 12 carbon atoms, cyclo-aliphatic dicarboxylic acids having 8 to 12 carbon atoms, and mixtures thereof.

The $C_1$-$C_4$ dicarboxylic diesters are dialkyl diesters of the above-mentioned dicarboxylic acids. The diesters are for instance dimethyl esters.

Preferably such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid and mixtures thereof.

Especially preferred acids and esters are terephthalic acid, dimethyl terephthalate, isophthalic acid and 2,6-naphthalene dicarboxylic acid.

The diols or glycols are derived from the generic formula HO—R—OH where R is an aliphatic, cycloaliphatic or aromatic moiety of 2 to 18 carbon atoms.

Preferably such diols or glycols are ethylene glycol, diethylene glycol, triethylene glycol, propane-1,3-diol, propane-1,2-diol, butane-1,4-diol, pentane-1,5-diol, hexane-1,6-diol, 1,4-cyclo-hexanedimethanol, 3-methylpentane-2,4-diol, 2-methylpentane-1,4-diol, 2,2-diethylpropane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxy-propoxyphenyl)ethane and mixtures thereof.

Most preferably, the diol is ethylene glycol, 1,4-cyclohexanedimethanol or butane-1,4-diol.

The polyester is preferably poly(ethylene terephthalate) PET or poly(ethylene 2,6-naphthalene-2,6-dicarboxylate) or poly(1,4-butylene terephthalate); most preferably poly(ethylene terephthalate).

The polyesters are prepared by methods well known in the art. Such methods are disclosed for example in U.S. published app. Nos. 2003083191 and 2004058805 and in U.S. Pat. Nos. 5,744,571, 6,013,756 and 5,453,479. These disclosures are incorporated herein by reference.

The first esterification or transesterification step is performed by mixing together one or more dicarboxylic acids or dicarboxylic diesters with one or more diols at temperatures in the range of about 150 to about 300° C., for example from about 200 to about 300° C., from about 260 to about 300° C., and at pressures of from atmospheric to about 0.2 mm Hg. The product is a low molecular weight precondensate.

In the second step, polycondensation is effected by increasing the temperature and lowering the pressure while excess diol is removed. The temperature is for example from about 250 to about 300° C., for example from about 275 to about 300° C. The pressure is reduced to from about 10 to about 0.1 torr, or from about 5 to about 0.5 torr.

One or both of the steps are advantageously performed in the presence of a metal phosphonic acid complex catalyst. The present catalyst is employed at a level of from about 1 to about 1500 ppm by weight, based on the total weight of dicarboxylic acid or dicarboxylic diester and diol. For example, the present catalyst is employed from about 1 to about 1000 ppm or from about 1 to about 500 ppm, based on the total weight of dicarboxylic acid or dicarboxylic diester and diol. For example, the present catalyst is employed from about 2 to about 250 ppm by weight, for instance from about 10 to about 300 ppm by weight, based on the weight of diacid or diester plus diol.

The metal phosphonic acid complex catalyst is also advantageously present for further solid state polymerization. The present catalysts provide for outstanding results during an optional solid state polymerization step.

The invention is further illustrated by the following Examples. All parts and percentages are by weight unless otherwise indicated.

Analytical Procedures

Intrinsic Viscosity (I.V.): 1 g of polymer is dissolved in 100 g of a 3:2 mixture of phenol and tetrachloroethane. The viscosity of this solution is measured at 35° C. using a Viscotek relative viscometer Y501C and recalculated to the intrinsic viscosity.

PET Pellet Color—The L* value measured on PET pellets using a DCI spectrophotometer by ASTM D1925, D65 10 degm specular included.

Present Aluminum Phosphonic Acid Complex Catalyst

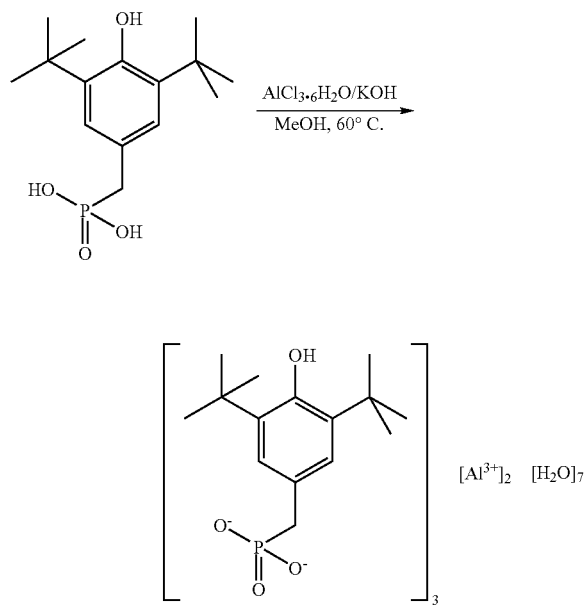

Comparative Aluminum Phosphonic Acid Complex

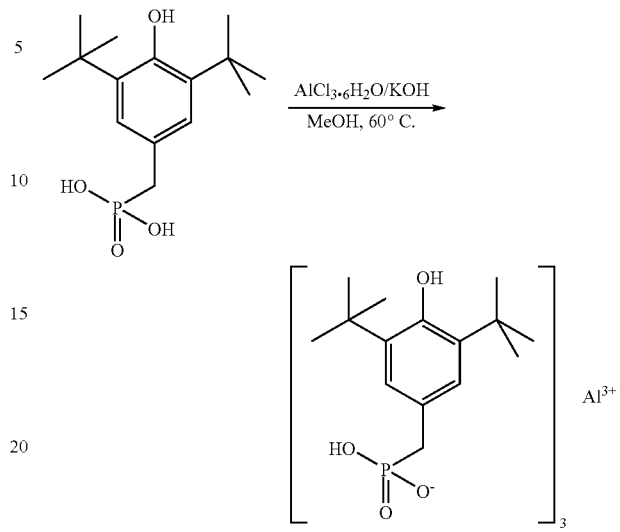

3.0 g (0.01 mole) of (3,5-di-tert-butyl-4-hydroxy-benzyl)-phosphonic acid is added to a solution containing 0.56 g (0.01 mole) of KOH dissolved in 30 ml methanol. Reaction mixture is stirred at room temperature under $N_2$ atmosphere for 1 h. The reaction mixture is then added, drop-wise, to another solution containing 0.8 g (0.003 mole) of $AlCl_3.6H_2O$ in 10 ml methanol. After completion of the addition, reaction mixture is heated at 60° C. for 3 h. Reaction mixture is then cooled to room temperature and solid is filtered. Filtrate is concentrated to give solid which is boiled with 30 mL distilled water for 2 h. Solid is filtered and dried in oven at ~70° C. till constant weight is obtained. 2.9 g of product is obtained.

| Theoretical | % C 58.43 | % H 7.85 | % Al 2.92 |
| Found | % C 55.82 | % H 8.44 | % Al 2.72 |

EXAMPLE 1

87.3 g terephthalic acid and 2.7 g isophthalic acid are mixed with 40.5 g EG (ethylene glycol) and subjected to typical esterification conditions (under ~40 psi nitrogen pressure for ~7 hours at 275~280° C.). The water from reaction will distill out of the apparatus beginning about 140° C. The reaction is continued until no more water is generated.

35 g blank precondensates from the esterification are mixed with 0.0288 g (~800 ppm) of the present aluminum phosphonic acid complex catalyst. The solid mixture is heated and stirred at 275° C. under nitrogen purge. The melted mixture is subsequently polycondensed under a gradually increasing vacuum from atmosphere to full vacuum (~0.8 torr) at 275° C. over 90 minutes. The polycondensation is continued under full vacuum for another 90 minutes. A polyethylene terephthalate is obtained with an intrinsic viscosity of 0.55 dl/g.

30.0 g (0.1 mole) of (3,5-di-tert-butyl-4-hydroxy-benzyl)-phosphonic acid is added to a solution containing 14.0 g (0.25 mole) of KOH dissolved in 300 ml methanol. Reaction mixture is stirred at room temperature under $N_2$ atmosphere for 1 h. This reaction mixture is then added, drop-wise, to another solution containing 24.1 g (0.1 mole) of $AlCl_3.6H_2O$ dissolved in 250 ml methanol. After completion of the addition, reaction mixture is heated at 60° C. under $N_2$ atmosphere for 3 h. Reaction mixture is then cooled to room temperature and solid is filtered. Filtrate is concentrated to give solid which is boiled with 300 mL of distilled water for 2 h. Solid is filtered and dried in oven at ~70° C. till constant weight is obtained. 31 g of product is obtained.

| Theoretical | % C 50.27 | % H 7.78 | % Al 5.02 |
| Found | % C 50.30 | % H 7.90 | % Al 4.97 |

EXAMPLE 2

87.3 g terephthalic acid and 2.7 g isophthalic acid are mixed with 40.5 g EG and 0.025 g $Sb_2O_3$ and subjected to typical esterification conditions (under ~40 psi nitrogen pressure for ~7 hours at 275~280° C. temp). The generated water from the reaction will distill out of the apparatus beginning about 140° C. The reaction is continued until no more water is generated.

40 g of precondensates containing 240 ppm $Sb_2O_3$ from the esterification are mixed with 0.0200 g (~500 ppm) of the present aluminum phosphonic acid complex catalyst. The solid mixture is heated and stirred at 275° C. under nitrogen purge. The melted mixture is subsequently polycondensed under a gradually increasing vacuum from atmosphere to full vacuum (~0.9 torr) at 275° C. over 90 minutes. The polycondensation is continued under full vacuum for another 90 minutes. A polyethylene terephthalate is obtained with an intrinsic viscosity of 0.70 dl/g.

General Polyester (PET) Synthesis Procedure A

General polymerization procedure for 4 L polycondensation batch reactor. A batch reactor is used which is equipped with a pressurized, heated autoclave reactor with impeller stirrer, inert gas inlet system, a fractionating column to separate water of reaction and ethylene glycol during esterification phase removing water from the reaction and returning ethylene glycol to the reaction mass; a sidearm transfer line connected to collection vessel and vacuum system capable of collecting reaction coproducts ethylene glycol and water during vacuum polycondensation; a discharge valve system at the bottom of the reactor for discharge and isolation of polymer product. Various process points are instrumented with thermocouples and pressure transducers to monitor or control the reaction system.

Materials
PTA, purified terephthalic acid (8.933 moles, 1484 grams)
PIA, purified isophthalic acid (0.276 moles, 46 grams)
EG, ethylene glycol (11.11 moles, 689 grams)
(optionally) a suppressant to reduce diethylene glycol formation (e.g.) Choline hydroxide as a 45% methanolic solution
antimony trioxide, 240 ppm
Other additives, as desired The EG (120 mole %) is added and stirring begun. A mixture of 97 mole % PTA with 3% PIA is charged to the reactor along with antimony trioxide. Solid additives may be added at this point, & washed into the reactor with EG. Optionally any liquid catalyst or additives can be added via syringe with several milliliters of EG. The DEG (diethylene glycol) suppressant may be added via pipette & washed in with EG. Reactor is purged with nitrogen then closed.

For the esterification phase, the reaction mass is conditioned for 20 minutes at a temperature range 93-105° C., stirring at 20 rpm. Heaters are set at 275° C. & sidearm is set to 150° C. Stirring is raised incrementally over 30 minutes, up to 60 rpm when melt temperature reads 200° C. The esterification step is conducted at nominally 50 psig nitrogen pressure and reaches an ultimate temperature of 270° C. The time of esterification begins when water is observed in sight glass of collector (that is, water distills out of fractionating column begins). When the reactor melt temperature reaches nominally 260° C., the heater setpoints are adjusted downward to a final setpoint of about 243° C. which allows a final esterification temperature of about 270° C.

It takes about 1 hour 45 minutes from beginning of the batch (time zero) until the beginning of water distillation from the fractionating column into the water collector. It takes an additional 120 minutes to complete esterification (i.e. when top of column temperature has dropped & stabilized at 125-135° C.).

The next phase of the process sometimes referred to as Atmospheric Esterification (alias pre-polycondensation) occurs when the reactor pressure is released and brought to atmospheric pressure. Atmospheric esterification is conducted for 30 minutes at 270° C. Additives optionally may be added to the reactor at this point using a septum on the addition port and a large gauge syringe.

The next phase of the process, vacuum polycondensation, occurs when the reactor pressure (i.e. applying a vacuum) is reduced over 60 minutes down to 1 torr or less via programmed vacuum reduction step-down program. Upon reaching final vacuum level, polycondensation continues for about 60 minutes at a final melt temperature target of 285-286° C. Over this total polycondensation time, the reactor stirring speed is reduced in increments as the polymer molecular weight (i.e. melt viscosity) increases. Typically the reactor is held at 60 rpm for 105 minutes, then at 50 rpm for 15 minutes, at 40 rpm for 10 minutes, and at 15 rpm for 15 minutes until polymer discharge. The total time of polycondensation may differ slightly since the reaction endpoint is generally determined by a motor torque value & not by reaction time. Polycondensations of significantly faster reaction rate will reach the endpoint torque value sooner than a standard polyester formulation, such as the case with improved catalysts or coadditives in the formulation. Upon reaching a given motor torque level the polymerization reaction is considered completed. At this time the batch is discharged from the bottom of the reactor, stranded through a water trough and converted to chip. The esterification time is 104 minutes and polycondensation time is 60 minutes. A polyester is produced with dilute solution viscosity value 0.63 dL/g, and carboxylic acid endgroup 24 meq/kg.

EXAMPLE 3

A polyester is produced per the general polyester (PET) synthesis procedure A. Instead of adding antimony oxide, a 15 gram slurry of EG containing 1.42 grams of the present aluminum phosphonic acid complex catalyst is added to the reactor at the end of atmospheric esterification stage of the process. The remainder of the polymerization process is conducted as described above. The esterification time is 96 minutes and polycondensation time is 80 minutes. A polyester is produced with dilute solution viscosity value 0.61 dL/g, and carboxylic acid endgroup 12 meq/kg.

General Polyester (PET) Synthesis Procedure B

A 2 L detachable autoclave reactor equipped with an external aluminum block heater, an anchor type stirrer, inert gas inlet system, a fractionating column to separate water of reaction and ethylene glycol during esterification phase removing water from the reaction and returning ethylene glycol to the reaction mass; a sidearm transfer line connected to a collection vessel and vacuum system capable of collecting reaction co-products, ethylene glycol and water, during vacuum polycondensation; and a discharge valve system at the bottom of the reactor for discharge and isolation of polymer product is used. The reactor vessel is instrumented with a thermocouple and pressure transducer to monitor the reaction system.

Materials
PTA, purified terephthalic acid (2.680 moles, 445.23 grams)
PIA, purified isophthalic acid (0.083 moles, 13.77 grams)
EG, ethylene glycol (3.587 moles, 222.66 grams)
(optionally) a suppressant to reduce diethylene glycol formation (e.g. Choline hydroxide as a 45% methanolic solution)
Polycondensation catalyst: antimony trioxide, 240 ppm
Other additives, as desired Terephthalic acid (97%), isophthalic acid (3%), ethylene glycol (130%) and choline hydroxide are mixed in a 2 L stainless steel reactor to form a paste. When employed, the polycondensation catalyst, antimony trioxide, is mixed with terephthalic acid during the paste preparation. The reaction mixture is purged and pressurized to 40 psig with nitrogen then heated up to 239-243° C. with stirring at 60 rpm in 70 minutes while pressure is raised to 50 psig. At this point a temperature drop is observed in the reactor which is indicative of the onset of esterification and distillation of water-of-reaction through the fractionating column. The reaction mixture is then further heated at 50 psig for 2 hours 20 minutes while the reactor temperature is slowly raised to 250-252° C.

The next phase of the process sometimes referred to as Atmospheric Esterification (alias pre-polycondensation) occurs when the reactor pressure is released and brought to 0 psig (atmospheric) in 5 minutes. Additives optionally may be added to the reactor at this point using a septum on the addition port and a large gauge syringe. During the atmospheric esterification the reaction temperature is slowly raised to 260-262° C. over a 40 minute period.

Following the atmospheric esterification step, the reactor pressure is reduced from atmospheric to full vacuum, 1.0 torr or less, while reaction temperature is slowly raised to 280-284° C. within 1 hour. Upon reaching final vacuum level, the polycondensation step continues until the desired molecular weight of the polymer is achieved and the reaction temperature increases to a final melt temperature target of 296-298° C. The progress of the polycondensation is monitored by recording the motor torque amperage. Once a desired amperage reading (2.00 amp) is reached, the stirrer is stopped, and polymer is collected via discharge from a drain valve at the bottom of the reactor, stranded through a water trough and converted to chip. The polycondensation time is counted from the end of the vacuum letdown point until the stop of stirrer and vacuum. The polycondensation time is 120 minutes. A polyester is produced with dilute solution viscosity value 0.62 dL/g and L* value 74.4.

EXAMPLE 4

A polyester is produced per the general example B procedure above. Instead of adding antimony oxide, a 16 gram slurry of EG containing 0.21 grams (400 ppm) of the present aluminum phosphonic acid complex catalyst is added to the reactor at the end of atmospheric esterification stage of the process. The remainder of the polymerization process is conducted as described above. The polycondensation time is 93 minutes. A polyester is produced with dilute solution viscosity value 0.63 dL/g and L* value 82.4.

EXAMPLE 5

A polyester is produced per the general example B procedure above. Instead of adding antimony oxide, a titanium containing catalyst (equivalent to 2.5 ppm Ti) is added with terephthalic acid at the beginning of esterification and a 16 gram slurry of EG containing 0.11 grams (200 ppm) of the present aluminum phosphonic acid complex catalyst is added to the reactor at the end of atmospheric esterification stage of the process. The remainder of the polymerization process is conducted as described above. The polycondensation time is 99 minutes. A polyester is produced with dilute solution viscosity value 0.62 dL/g.

General Solid State Polycondensation (SSP) Procedure C

The polycondensation in the melt as described in the general procedure B above is followed by a solid state polycondensation (SSP) to further increase the molecular weight as measured by monitoring the dilute solution intrinsic viscosity (I.V.).

The following description illustrates the general procedure:

500 grams of polyethylene terephthalate pellets prepared according to general example B, using 240 ppm of antimony oxide, is placed in a drying oven for 16 hours at 110° C. under a vacuum of 50 torr to dry the pellets. The dried pellets are transferred into a vacuum tumbling dryer. During continuous tumbling of the polyethylene terephthalate under a vacuum of 1 to 2 torr, the temperature is raised to 216° C. over a 2 hour period. After 10 hours at 216° C., the polyethylene terephthalate pellets are cooled. A polyester is produced with dilute solution intrinsic viscosity value (I.V.) 0.71 dL/g and L* value 85.2.

EXAMPLE 6

A polyester is produced by the procedure of Example 4 and 500 grams of the polyethylene terephthalate pellets are further reacted according to the Solid State Polycondensation (SSP) procedure C at 217° C. over a 10 hour period. A polyester is produced with dilute solution intrinsic viscosity value (I.V.) 0.82 dL/g and L* value 88.7.

EXAMPLE 7

Examples 2 and 5 are repeated, replacing antimony oxide and the titanium based catalyst with germanium oxide. Excellent results are achieved.

As shown, the present aluminum phosphinic acid complex catalyst may be employed together with other known catalysts, for example antimony, titanium or germanium catalysts.

The invention claimed is:

1. A method for the preparation of a polyester, which method comprises
in a first step, reacting a dicarboxylic acid or a $C_1$-$C_4$ dicarboxylic diester with a diol at a suitable temperature and pressure to effect esterification or transesterification to prepare a precondensate and
in a second step, reacting the precondensate to effect polycondensation at a suitable temperature and pressure to prepare a high molecular weight polyester,
where a metal phosphonic acid complex compound of the formula

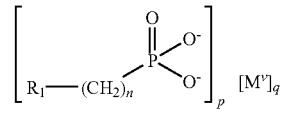

is employed in the first step, in the second step or in both the first and second steps as a reaction catalyst; and
wherein
n is 0, 1, 2, 3, 4, 5 or 6;
p is an integer from 1 to 30;
M is a metal selected from the group consisting of Li, Na, K, Cs, Be, Ca, Mg, Sr, Ba, Al, Sb, Cd, Mn, Fe, Co, Ni, Cu and Zn;
v is the valency of the metal M and is 1, 2 or 3;
q is an integer from 1 to 20 where q=2p/v; and
$R_1$ is hydrogen, straight or branched chain alkyl of 1 to 36 carbon atoms, straight or branched chain alkenyl of 1 to 36 carbon atoms, cycloalkyl of 5 to 8 carbon atoms or aryl of 6 to 10 carbon atoms; or is said alkyl, alkenyl, cycloalkyl or aryl substituted by one to four hydroxyl, halogen, straight or branched chain alkoxy of 1 to 8 carbon atoms, straight or branched chain alkyl of 1 to 8 carbon atoms or amino groups.

2. A method according to claim 1 where the metal phosphonic acid complex compound is of the formula

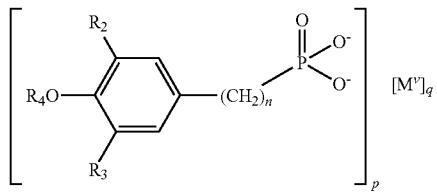

wherein n is 0, 1, 2, 3, 4, 5 or 6;

p is an integer from 1 to 30 where p=(v·q)/2;

M is a metal selected from the group consisting of Li, Na, K, Cs, Be, Ca, Mg, Sr, Ba, Al, Sb, Cd, Mn, Fe, Co, Ni, Cu and Zn;

v is the valency of the metal M and is 1, 2 or 3;

q is an integer from 1 to 20 where q=2p/v; and $R_2$ and $R_3$ are independently hydrogen, hydroxyl, halogen, straight or branched chain alkoxy of 1 to 8 carbon atoms, straight or branched chain alkyl of 1 to 8 carbon atoms or amino; and $R_4$ is hydrogen or straight or branched chain alkyl of 1 to 8 carbons atoms.

3. A method according to claim 1 where the metal phosphonic acid complex compound is of the formula

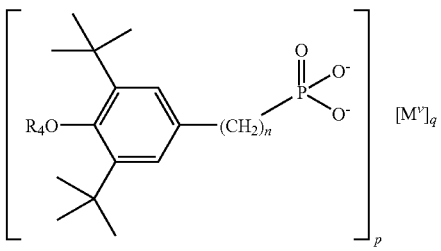

wherein n is 0, 1, 2, 3, 4, 5 or 6;

p is an integer from 1 to 30 where p=(v·q)/2;

M is a metal selected from the group consisting of Li, Na, K, Cs, Be, Ca, Mg, Sr, Ba, Al, Sb, Cd, Mn, Fe, Co, Ni, Cu and Zn;

v is the valency of the metal M and is 1, 2 or 3;

q is an integer from 1 to 20 where q=2p/v; and $R_4$ is hydrogen or straight or branched chain alkyl of 1 to 8 carbons atoms.

4. A method according to claim 1 where the metal phosphonic acid complex compound is of the formula

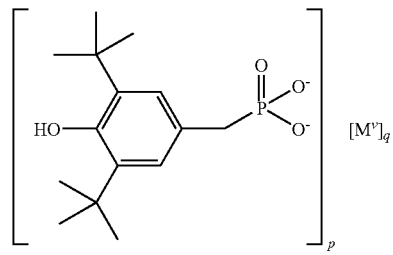

where p is an integer from 1 to 30 where p=(v·q)/2;

M is a metal selected from the group consisting of Li, Na, K, Cs, Be, Ca, Mg, Sr, Ba, Al, Sb, Cd, Mn, Fe, Co, Ni, Cu and Zn;

v is the valency of the metal M and is 1, 2 or 3; and q is an integer from 1 to 20 where q=2p/v.

5. A method according to claim 1 where the metal phosphonic acid complex compound is of the formula

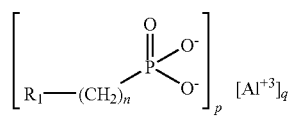

wherein n is 0, 1, 2, 3, 4, 5 or 6;

p is an integer from 3 to 30;

q is an integer from 2 to 20 where q=2p/3; and $R_1$ is hydrogen, straight or branched chain alkyl of 1 to 36 carbon atoms, straight or branched chain alkenyl of 1 to 36 carbon atoms, cycloalkyl of 5 to 8 carbon atoms or aryl of 6 to 10 carbon atoms; or is said alkyl, alkenyl, cycloalkyl or aryl substituted by one to four hydroxyl, halogen, straight or branched chain alkoxy of 1 to 8 carbon atoms, straight or branched chain alkyl of 1 to 8 carbon atoms or amino groups.

6. A method according to claim 1 where the metal phosphonic acid complex compound is of the formula

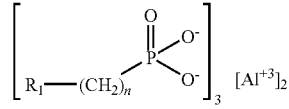

wherein n is 0, 1, 2, 3, 4, 5 or 6;

$R_1$ is hydrogen, straight or branched chain alkyl of 1 to 36 carbon atoms, straight or branched chain alkenyl of 1 to 36 carbon atoms, cycloalkyl of 5 to 8 carbon atoms or aryl of 6 to 10 carbon atoms; or is said alkyl, alkenyl, cycloalkyl or aryl substituted by one to four hydroxyl, halogen, straight or branched chain alkoxy of 1 to 8 carbon atoms, straight or branched chain alkyl of 1 to 8 carbon atoms or amino groups.

7. A method according to claim 1 where the metal phosphonic acid complex compound is of the formula

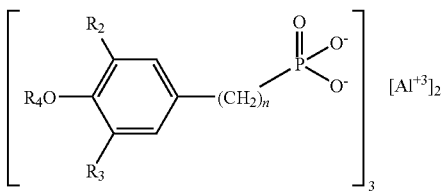

wherein n is 0, 1, 2, 3, 4, 5 or 6;

$R_2$ and $R_3$ are independently hydrogen, hydroxyl, halogen, straight or branched chain alkoxy of 1 to 8 carbon atoms, straight or branched chain alkyl of 1 to 8 carbon atoms or amino; and $R_4$ is hydrogen or straight or branched chain alkyl of 1 to 8 carbons atoms.

8. A method according to claim 1 where the metal phosphonic acid complex compound is of the formula

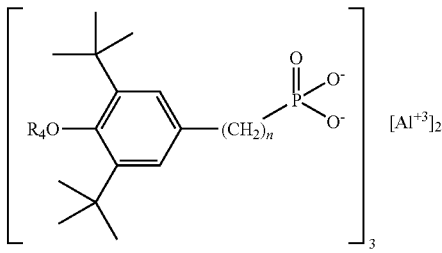

wherein n is 0, 1, 2, 3, 4, 5 or 6; and $R_4$ is hydrogen or straight or branched chain alkyl of 1 to 8 carbons atoms.

9. A method according to claim 1 where the aluminum phosphonic acid complex compound is

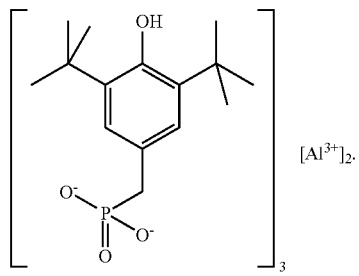

10. A method according to claim 1 where a dicarboxylic acid is reacted with a diol to prepare a precondensate and where the dicarboxylic acid is terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid or a mixture thereof.

11. A method according to claim 1 where a dicarboxylic diester is reacted with a diol to prepare a precondensate and where the dicarboxylic diester is a C1-C4 dialkyl diester of terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid or a mixture thereof.

12. A method according to claim 10 where the diacid is terephthalic acid, isophthalic acid or 2,6-naphthalene dicarboxylic acid.

13. A method according to claim 11 where the diester is dimethyl terephthalate.

14. A method according to claim 1 where the diol is ethylene glycol, diethylene glycol, triethylene glycol, propane-1,3-diol, propane-1,2-diol, butane-1,4-diol, pentane-1,5-diol, hexane-1,6-diol, 1,4-cyclohexanedimethanol, 3-methylpentane-2,4-diol, 2-methylpentane1,4-diol, 2,2-diethylpropane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane or a mixtures thereof.

15. A method according to claim 1 where the diol is ethylene glycol, 1,4-cyclohexanedimethanol or butane-1,4-diol.

16. A method according to claim 1 where the polyester is poly(ethylene terephthalate), poly(ethylene 2,6-naphthalene-2,6-dicarboxylate) or poly(1,4-butylene terephthalate).

17. A method according to claim 1 where the first step is performed at a temperature from about 200 to about 300° C.

18. A method according to claim 1 where the second step is performed at a temperature from about 250 to about 300° C. and at a pressure from about 10 to about 0.1 torr.

19. A method according to claim 1 where the catalyst is employed at a level from about 1 to about 1500 ppm by weight, based on the weight of dicarboxylic acid or dicarboxylic diester and diol.

20. A method according to claim 1 where the catalyst is employed at a level from about 1 to about 1000 ppm by weight, based on the weight of dicarboxylic acid or dicarboxylic diester and diol.

* * * * *